United States Patent [19]
Yasuoka

[11] Patent Number: 5,976,054
[45] Date of Patent: Nov. 2, 1999

[54] SHIFT SHOCK REDUCING APPARATUS OF CVT EQUIPPED VEHICLE

[75] Inventor: Masayuki Yasuoka, Yokohama, Japan

[73] Assignee: Nissan Motor Co., Ltd., Yokohama, Japan

[21] Appl. No.: 09/103,530

[22] Filed: Jun. 24, 1998

[30] Foreign Application Priority Data

Jun. 27, 1997 [JP] Japan ...................................... 9-171631

[51] Int. Cl.$^6$ .................................................. B60K 41/12
[52] U.S. Cl. .................................. 477/48; 477/109; 477/46
[58] Field of Search .................................. 477/43, 46, 48, 477/20, 2, 109

[56] References Cited

U.S. PATENT DOCUMENTS

| | | | |
|---|---|---|---|
| 4,817,469 | 4/1989 | Shigematsu et al. | 477/46 X |
| 5,607,373 | 3/1997 | Ochiai et al. | 477/48 X |
| 5,628,705 | 5/1997 | Kashiwabara | 477/48 X |
| 5,755,303 | 5/1998 | Yamamoto et al. | 477/46 X |
| 5,776,028 | 7/1998 | Matsuda et al. | 477/45 |
| 5,790,968 | 8/1998 | Kashiwabara | 477/46 X |
| 5,842,948 | 12/1998 | Yuasa et al. | 477/46 X |
| 5,846,155 | 12/1998 | Taniguchi et al. | 477/2 |

FOREIGN PATENT DOCUMENTS

| | | |
|---|---|---|
| 5-99011 | 4/1993 | Japan . |
| 7-239002 | 9/1995 | Japan . |
| 9-70104 | 3/1997 | Japan . |

*Primary Examiner*—Khoi Q. Ta
*Attorney, Agent, or Firm*—Foley & Lardner

[57] ABSTRACT

A shift shock reducing apparatus installed in a vehicle which is equipped with a power train constituted by a continuously variable transmission (CVT) and an engine. The shift shock reducing apparatus comprises a calculating section which calculates an inertia torque caused by a shifting from a rate of change in a CVT ratio per time and an output torque correcting section which corrects a toque inputted to the CVT on the basis of the calculated inertia torque so as to cancel the inertia torque. Therefore, shift shocks due to the inertia torque is suppressed without generating a shift delay.

16 Claims, 10 Drawing Sheets

SHIFT SHOCK REDUCING APPARATUS OF CVT EQUIPPED VEHICLE

The contents of Application No. 9-171631, with a filing date Jun. 27, 1997 in Japan, are hereby incorporated by reference.

BACKGROUND OF THE INVENTION

The present invention relates to improvements in a shift shock reducing apparatus of a continuously variable transmission equipped vehicle.

A continuously variable transmission (CVT) such as a belt type CVT or toroidal type CVT is generally arranged to execute a shift control in a manner such as to obtain a target transmission ratio from a required engine load and a vehicle speed and to adjust an actual transmission ratio (actual CVT ratio) at the target transmission ratio. Therefore, in case that the required engine load is increased according to the increase of a depression of an accelerator pedal to accelerate the vehicle or that the vehicle speed is decreased due to the shortage of the driving force, the target transmission ratio is increased, that is, it is changed to a lower speed side transmission ratio. More particularly, the CVT is downshifted to the increased target transmission ratio. On the other hand, in case of a low-load driving condition such that the required engine load is decreased according to the decrease of the depression of the accelerator pedal or in case of a vehicle speed increasing condition such that the vehicle speed is increased due to excessive driving force, the target transmission ratio is decreased, that is, it is changed to a higher speed side transmission ratio. More particularly, the CVT is upshifted to the decreased target transmission ratio. By this shifting, the engine rotation speed (engine rotation inertia) is changed according to the change of the transmission ratio. When the downshift is executed while increasing the engine rotation speed, the engine torque is lowered by a negative inertia torque as shown by a two-dot chain line in FIG. 9D. This lowering of the engine torque generates shift shocks having a pop-down feeling of the torque such as shown by hatching parts of FIGS. 9E and 9F. Further, when the upshift is executed while decreasing the engine rotation speed, a positive inertia is generated. This positive inertia generates shift shocks having a pop-up feeling of the torque, though not shown in the Figure.

Figure 10A:
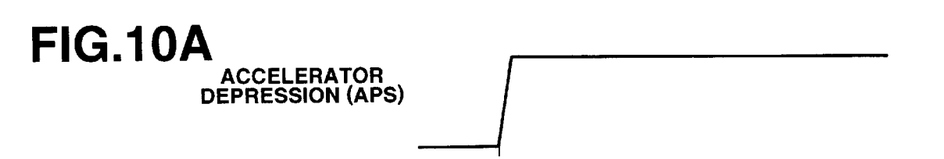
FIGS. 10A to 10F are time charts showing comparisons between the result of the shift control and the shift shock reducing control of the first embodiment and a result of another convention shift shock reducing process.
Figure 10B:
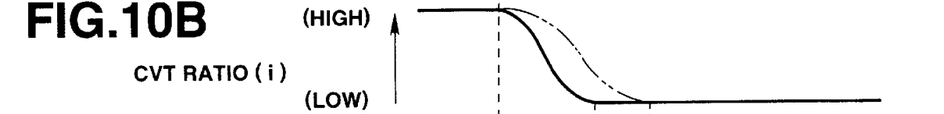
Figure 10C:
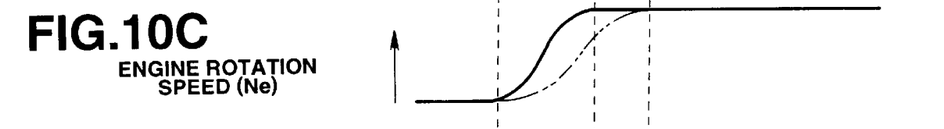
Figure 10D:
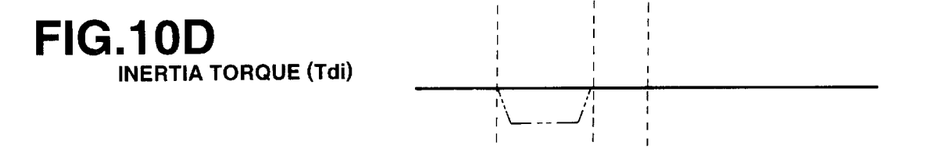
Figure 10E:
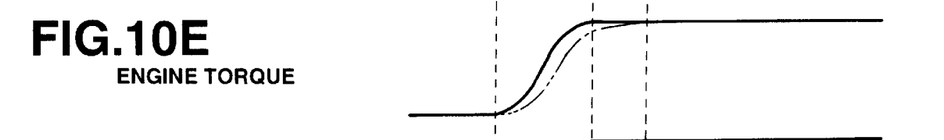
Figure 10F:
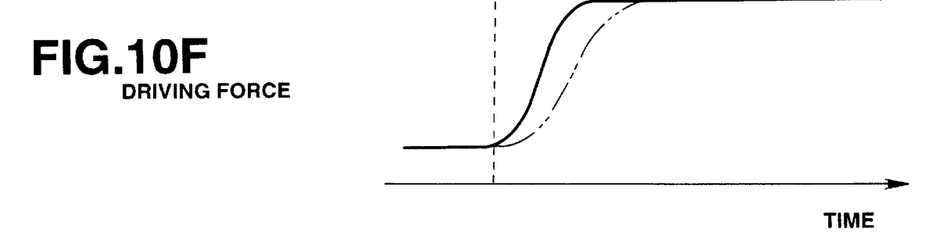

In order to suppress these shift shocks, various apparatuses have been proposed, for example, in Japanese Patent Provisional Publications Nos. 5-99011 and 7-239002. An apparatus disclosed in the former publication is arranged to lower an engine torque when the shifting is started, in order to suppress shift shocks caused by the upshift. Further, an apparatus disclosed in the latter publication is arranged to decrease a rate of change in the transmission ratio (CVT ratio) per time as shown by a two-dot chain line in FIG. 10B to suppress shift shocks as shown by two-dot chain lines in FIGS. 10D, 10E and 10F.

However, these two conventional apparatuses still have problems to be solved, such that it is difficult to satisfactorily suppress shift shocks during the shifting or to execute shift shock reducing process without degrading the drivability of a vehicle.

SUMMARY OF THE INVENTION

It is an object of the present invention to provide an improved shift shock reducing apparatus which sufficiently suppresses shift shocks due to an inertia torque caused by a shifting without degrading the drivability of a vehicle.

A shift shock reducing apparatus according to the present invention is for a vehicle equipped with a power train constituted by a continuously variable transmission (CVT) and an engine. The shift shock reducing apparatus comprises a calculating section for calculating an inertia torque caused by a shifting from a rate of change in a CVT ratio per time and an output torque correcting section for correcting a toque inputted to the CVT on the basis of the calculated inertia torque so as to cancel the inertia torque.

Furthermore, the output torque correcting section of the above mentioned shift shock reducing apparatus according to the present invention may be specified by one of an engine output torque correcting section arranged to correct an output torque of the engine through a control of a throttle valve and a reversible motor which generates a torque for canceling the inertia torque and applies the generated torque to the CVT.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1 to 4 and 9A to 9F, there is shown a first embodiment of a shift shock reducing apparatus for an automotive vehicle equipped with a continuously variable transmission (CVT), in accordance with the present invention.

Figure 1:
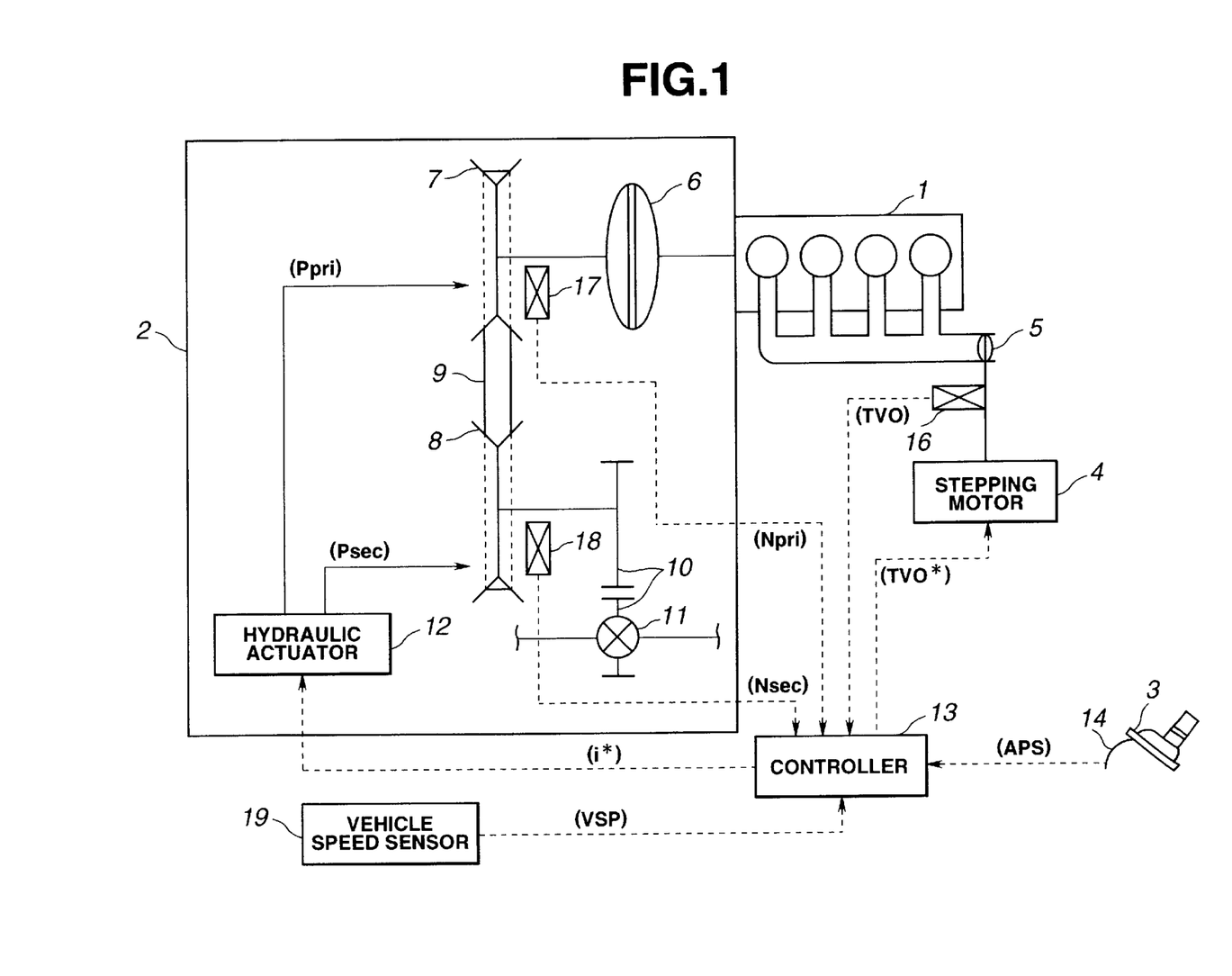
FIG. 1 is a schematic view showing a power train of an automotive vehicle equipped with a continuously variable transmission which is provided with a shift shock reducing apparatus of a first embodiment according to the present invention.

As shown in FIG. 1, the automotive vehicle equipped with the shift shock reducing apparatus according to the present invention comprises a power train and a control system thereof. The power train comprises an engine 1 and a continuously variable transmission (CVT) 2. The engine 1 is not directly connected to (not linked with) an accelerating pedal (accelerator) 3 and comprises a throttle valve 5 connected to a stepping motor 4. The stepping motor 4 is electrically controlled by a controller 13 to adjust a throttle opening TVO at a target throttle opening TVO*. More particularly, an output shaft of the stepping motor 4 is connected to the throttle valve 5, and the controller 13 accurately controls a rotation angle of the output shaft of the stepping motor 4 so that the throttle valve 5 is set at the target throttle opening TVO*. By this control of the stepping motor 4, the engine 1 is controlled so as to output a power according to the target throttle opening TVO*. As is clear from FIG. 1, the flow of air supplied to cylinders of the engine 1 is controlled according to the throttle opening TVO of the throttle valve 5.

The CVT 2 is of a well-known V belt type and comprises a primary pulley 7 which is drivingly connected to an output shaft of the engine 3 through a torque converter 6, a secondary pulley 8 arranged side axially with the primary pulley 7 and a V belt 9 drivingly interconnecting the primary and secondary pulleys 7 and 8. The secondary pulley 8 is drivingly connected to a differential gear unit 11 through a final drive gear unit 10 so as to drive wheels (not shown) of the vehicle.

The primary and secondary pulleys 7 and 8 are arranged to vary the effective radius thereof by axially moving movable discs of the primary and secondary pulleys 7 and 8, respectively. By axially moving the both movable discs to positions corresponding to a primary pulley pressure $P_{pri}$ and a secondary pulley pressure $P_{pri}$ generated by a hydraulic actuator 12 according to the target CVT ratio i*, the CVT 2 implements a continuous shifting such that the actual CVT ratio is adjusted at the target CVT ratio i*.

The controller 13 is arranged to calculate the target throttle opening TVO* and the CVT ratio i*. The controller 13 receives a signal indicative of a depression degree APS of an accelerating pedal 3 from an accelerator depression sensor 14, a signal indicative of a throttle opening TVO from a throttle opening sensor 16, a signal indicative of a primary rotation speed $N_{pri}$ of the primary pulley 7 from a primary pulley rotation speed sensor 17, a signal indicative of a secondary rotation speed $N_{sec}$ of the secondary pulley 8 from a secondary pulley rotation speed sensor 18 and a signal indicative of a vehicle speed VSP from a vehicle speed sensor 19.

Figure 2:
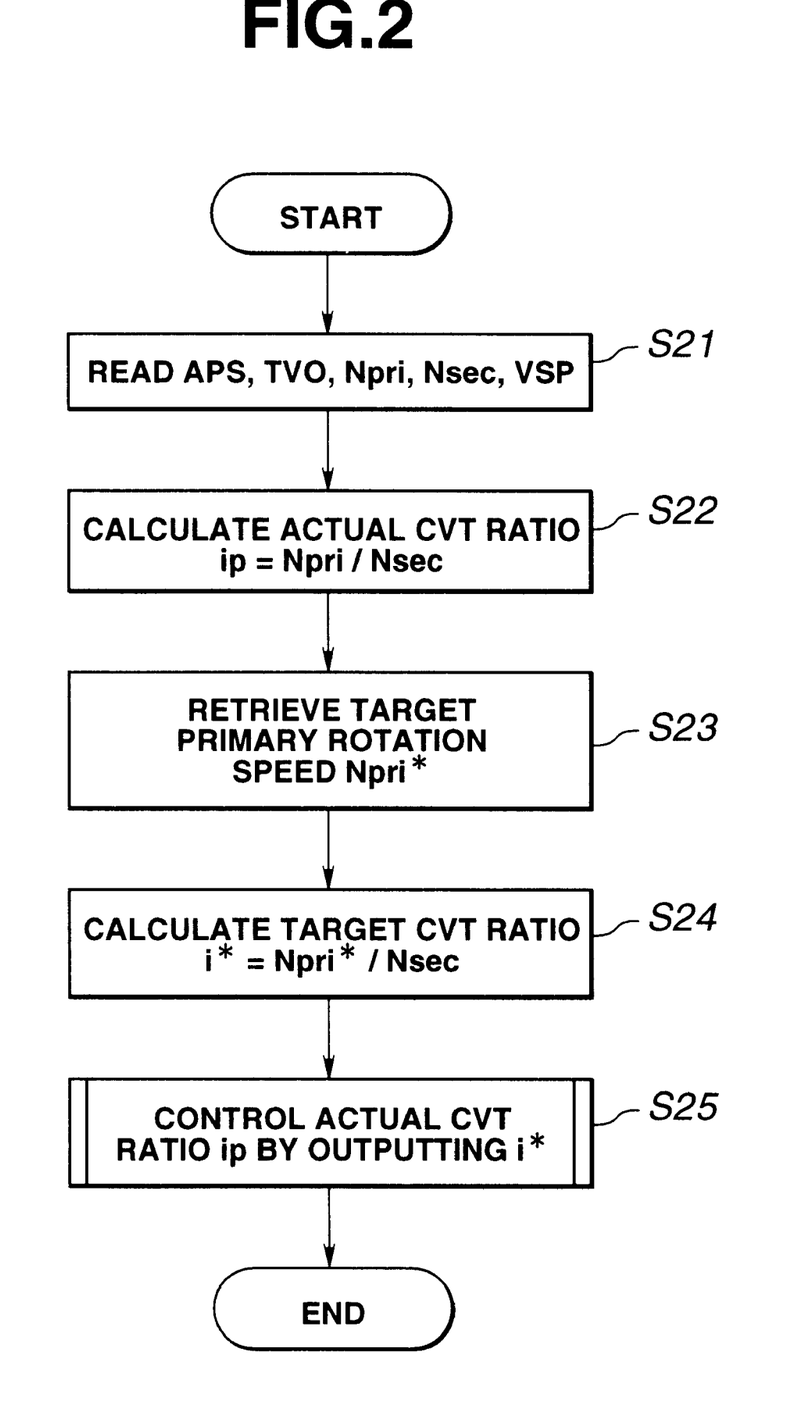
FIG. 2 is a flowchart showing a shift control program executed by a controller of the first embodiment.
Figure 4:
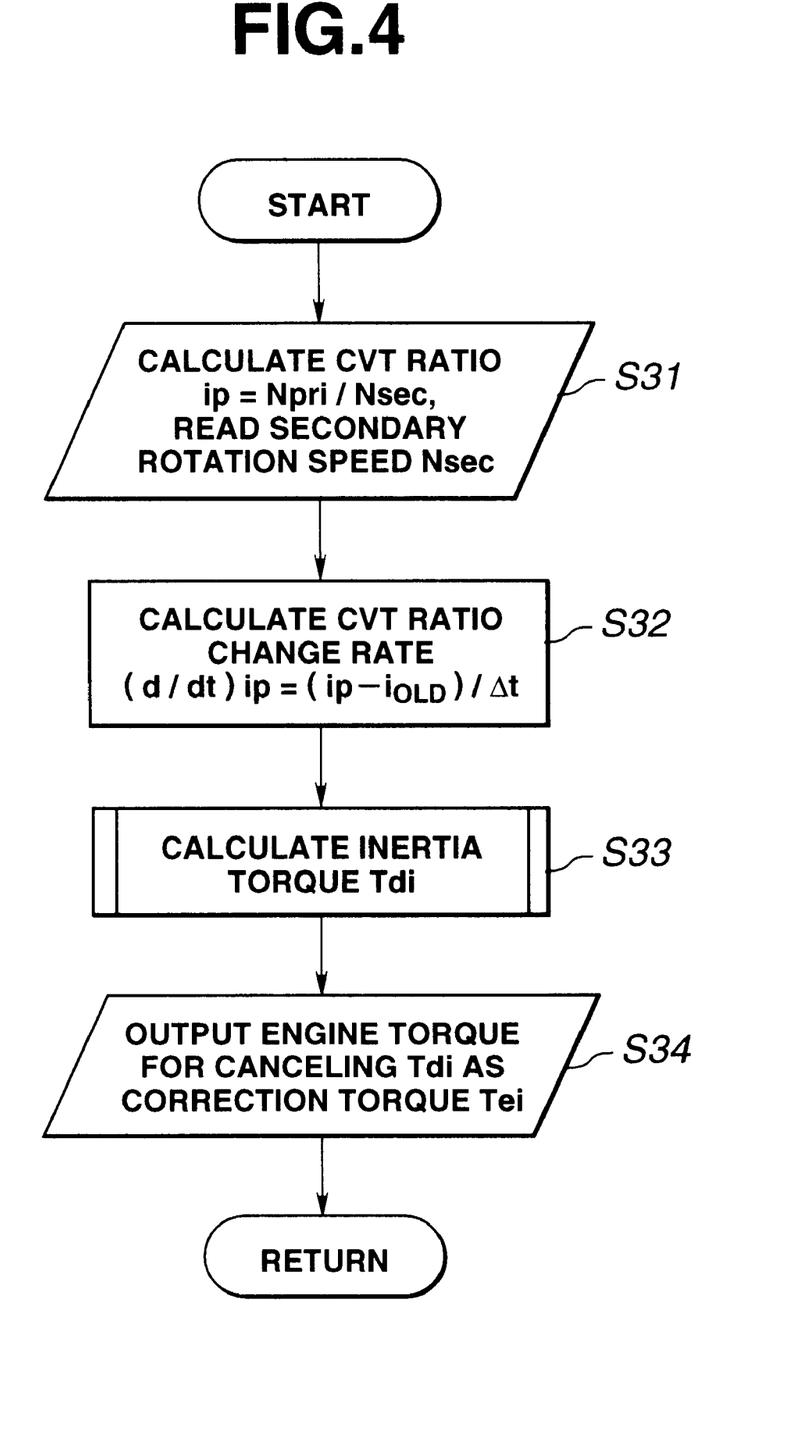
FIG. 4 is a flowchart showing a throttle control program for reducing the shift shock during a shifting executed by the controller of the first embodiment.

The controller 13 implements a shift control shown by a flowchart of FIG. 2 and a throttle opening control shown by a flowchart of FIG. 4.

First, the shift control of FIG. 2 will be discussed.

At a step S21, the controller 13 reads the accelerator depression APS, the throttle opening TVO, the primary rotation speed $N_{pri}$, the secondary rotation speed $N_{sec}$ and the vehicle speed VSP.

At a step S22, the controller 13 calculates an actual CVT ratio $i_p$ from the equation $i_p = N_{pri}/N_{sec}$. The actual CVT ratio $i_p$ is a ratio of the primary rotation speed $N_{pri}$ to the secondary rotation speed $N_{sec}$.

Figure 3:
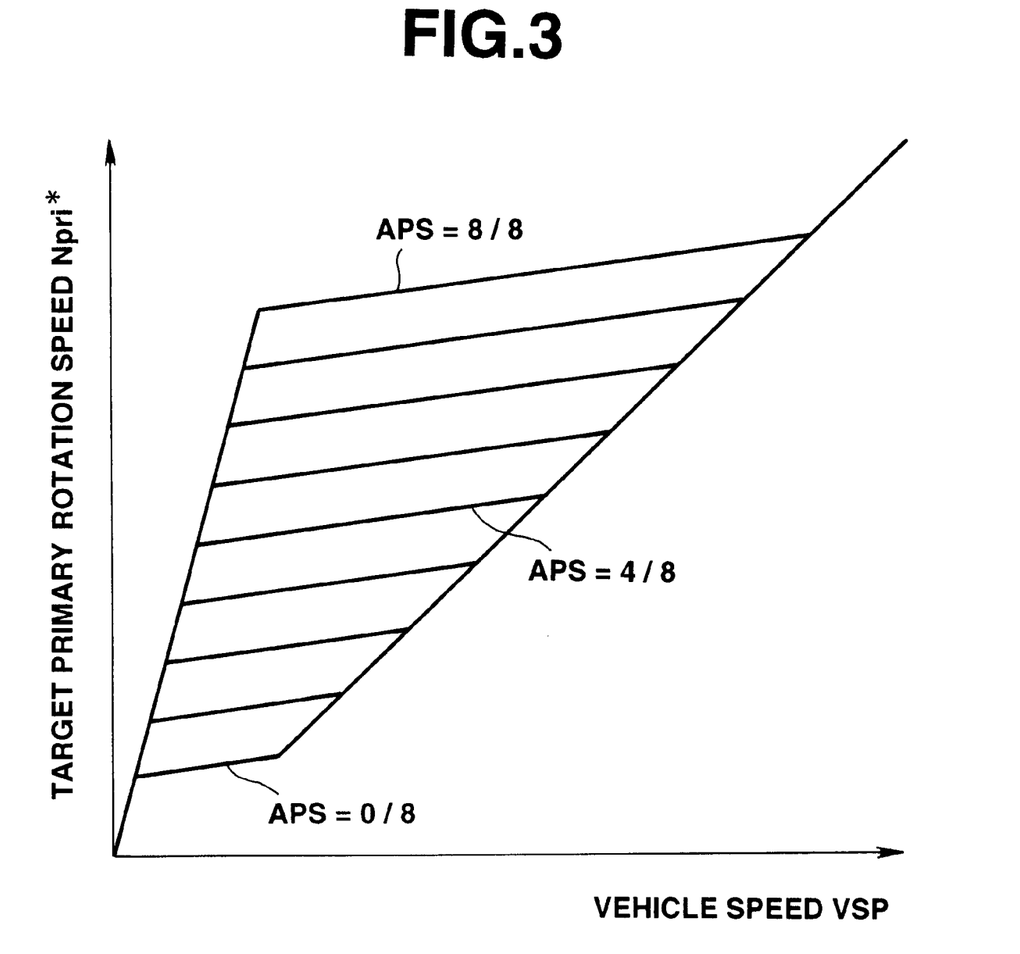
FIG. 3 is a graph showing a shift map employed in the shift control of the first embodiment.

At a step S23, the controller 13 retrieves a target primary rotation speed $N_{pri}*$ from the acceleration depression APS, the vehicle speed VSP and a predetermined shift map such as a map shown in FIG. 3.

At a step S24, the controller 13 calculates the target CVT ratio i* from the equation $i*=N_{pri}*/N_{sec}$. That is, the target CVT ratio corresponding to the target primary rotation speed $N_{pri}*$ by dividing the target primary rotation speed $N_{pri}*$ by the secondary rotation speed $N_{sec}$.

At a step S25, the controller 13 outputs the target CVT ratio i* to the hydraulic actuator 12 to control the actual CVT ratio $i_p$ at the target CVT ratio i*.

Next, the throttle opening control shown in FIG. 4 will be discussed.

At a step S31, the controller 13 calculates the actual CVT ratio $i_p$ from the equation $i_p=N_{pri}/N_{sec}$ and reads the rotation speed $N_{sec}$ of the secondary pulley 8.

At a step S32, the controller 13 calculates a rate $(d/dt)i_p$ of change in the actual CVT ratio $i_p$ per time (a shift speed $(d/dt)i_p$). More particularly, the shift speed $(d/dt)i_p$ is obtained by dividing a difference $i_{p-iOLD}$ between the present actual CVT ratio $i_p$ and a previous actual CVT ratio $i_{OLD}$ by a calculation cycle $\Delta t$, that is, $(d/dt)i_p=(i_p-i_{OLD})/\Delta t$.

At a step S33, the controller 13 calculates an inertia torque $T_{di}$ generated by the shifting from the shift speed $(d/dt)i_p$ and by the following manner.

First, a discussion will be started as to the operation under the lockup condition of the torque converter 6 under which the engine torque is directly transmitted to the primary pulley 7.

It is assumed that an equal inertia $I_{da}$ around an axis of the vehicle is represented by the following equation (1).

$$I_{da}=(I_e+I_i)I_p^2 \cdot i_f^2 + I_{sec} \cdot i_f^2 + I_d \tag{1}$$

where $I_e$ is a rotation inertia of the engine 1, $I_i$ is a rotation inertia around the input shaft, $i_p$ is the CVT ratio, $i_f$ is a final reduction ratio of the final drive ring gear unit 10, $I_{sec}$ is a rotation inertia around the secondary pulley 8, and $I_d$ is a rotation inertia around the axis of the vehicle.

The energy equation around the axis of the vehicle is commonly represented by the following equation.

$$\int (T_d - T_{R/L}) n_d \cdot dt = (1/2) I_{da} \cdot n_d^2$$

where $T_d$ is a vehicle axis torque, $T_{R/L}$ is a running resistance of the vehicle, and $n_d$ is an angle speed of the vehicle axis.

By differentiating the above-mentioned energy equation by time, the following equation (2) is obtained.

$$(T_d - T_{R/L}) n_d = (1/2) n_d^2 \cdot (d/dt) I_{da} + I_{da} \cdot n_d \cdot (d/dt) n_d \tag{2}$$

Since the terms except for the actual CVT ratio $i_p$ is constant in the equation (1), the following equation (3) is derived.

$$(d/dt) I_{da} = 2(I_e+I_i) i_p \cdot i_f^2 \cdot (d/dt) i \tag{3}$$

By substituting the equation (3) into the equation (2), and rearranging it, the following equation (4) is obtained.

$$I_{da} \cdot (d/dt) n_d = (T_d - T_{R/L}) - (I_e+I_i) i_p \cdot i_f^2 \cdot n_d \cdot (d/dt) i_p \tag{4}$$

where a first term in a right side is a constant term, and a second term in the right side is a transient term and represents the inertia torque $T_{di}$ generated at a wheel drive shaft by the shifting.

At a step S34, the controller 13 calculates an engine torque conversion value $T_{ei}$ for canceling the inertia torque $T_{di}$ generated by the shifting from the following equation.

$$T_{ei} = (T_{di})/i_p \cdot i_f$$

-continued $$= (I_e + I_i)i_f^2 \cdot n_d \cdot (d/dt)i_p$$

Since the term $(i_f \cdot n_b)$ of the above equation is represented by the secondary rotation speed $N_{sec}$ as follows:

$$(i_f n_d) = (2\pi/60)N_{sec},$$

the above equation is represented as follows:

$$T_{ei} = (I_e + I_i)(2\pi/60)N_{sec} \cdot (d/dt)i_p \quad (5)$$

Further, at the step S34, the controller 13 outputs the engine torque conversion value $T_{ei}$ for canceling the inertia torque $T_{di}$ as an engine correction torque.

Next, a discussion will be started as to the operation under a converter condition where the torque converter 6 is not put in the lockup condition and transmits the engine torque to the primary pulley 7 while amplifying the engine torque.

Under this converter condition, the motion equation of a pump impeller of the torque converter 6 and the motion equation of a turbine runner of the torque converter 6 are respectively represented by the following equations (6) and (7).

$$I_e \cdot (d/dt)n_e = T_e - T_i \quad (6)$$

$$I_t \cdot (d/dt)n_t = T_t - T_{R/L} \quad (7)$$

where $n_e$ is an engine angle speed, $T_e$ is the engine torque, $T_i$ is a torque converter input torque, $I_t$ is a rotation inertia of the turbine runner, $n_t$ is an angle speed of the turbine runner, and $T_t$ is a transmission torque of the turbine runner.

When the speed ratio of the torque converter 6 is e, and a torque ratio is t, the transmission torque $T_t$ and the engine angle speed $n_e$ of the equations (6) and (7) are represented by the following equation (8) and (9).

$$T_t = t \cdot T_i \quad (8)$$

$$n_e = (1/e)n_t \quad (9)$$

The following equation (10) is derived from the equation (6).

$$T_i = T_e - I_e(d/dt)n_e \quad (10)$$

The following equation is derived from the equation (9).

$$(d/dt)n_e = (1/e)(d/dt)n_t - (1/e^2)n_t(d/dt)e$$

Since $(d/dt)n_t$ is much greater than $(d/dt)e$, the second term of the above equation may be negligible as follows.

$$(d/dt)n_e = (1/e)(d/dt)n_t \quad (11)$$

Accordingly, the following equation is obtained from the equations (7), (8), (10) and (11).

$$I_t(d/dt)n_t = t[T_e - (1/e)(d/dt)n_t] - T_{R/L}$$

by arranging the above equation, the following equation is obtained.

$$[I_t + (t/e)I_e](d/dt)n_t = t \cdot T_e - T_{R/L}$$

Consequently, the rotation inertia $I_{ta}$ around the turbine runner under the converter condition of the torque converter 6 is represented by the following equation (12).

$$I_{ta} = I_t + (t/e)I_e \quad (12)$$

Therefore, the correction torque $T_{ei}$, which is for compensating the inertia by canceling the inertia torque caused by the shifting under the converter condition of the torque converter 6, is obtained from the equations (5) and (12) as follows:

$$T_{ei} = [(t/e)I_e + I_i](2\pi/60)N_{sec} \cdot (d/dt)i_p \cdot (1/t) \quad (13)$$

Since the controller 13 outputs the correction torque $T_{ei}$ derived from the equation (5) or (13) at the step S34 in the flowchart of FIG. 4, the target throttle opening TVO*, which is normally determined at a value in correspondence with the accelerating depression APS, is corrected (increased or decreased) by a accelerator pedal depression degree corresponding to the correction torque $T_{ei}$. That is, the controller 13 executes the throttle control of the throttle valve 5 by outputting the command signal indicative of the corrected target throttle opening TVO* to the stepping motor 4 to adjust the actual throttle opening TVO at the target throttle opening TVO*.

Figures 9A, 9B:
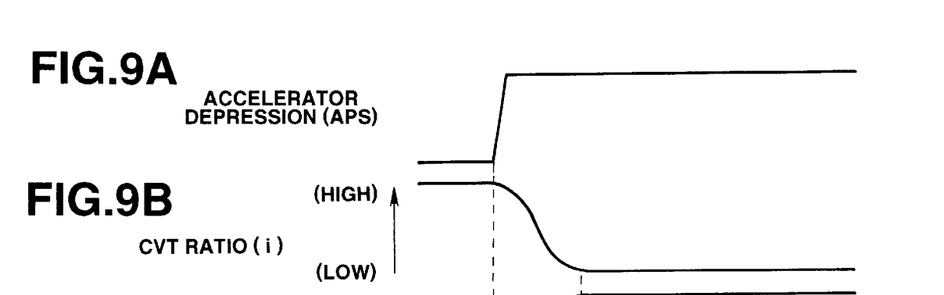
FIGS. 9A to 9F are time charts showing comparisons between the result of the shift control and the shift shock reducing control of the first embodiment and a result of a convention shift shock reducing process.
Figure 9C:
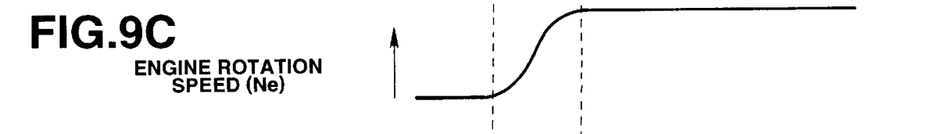
Figure 9D:
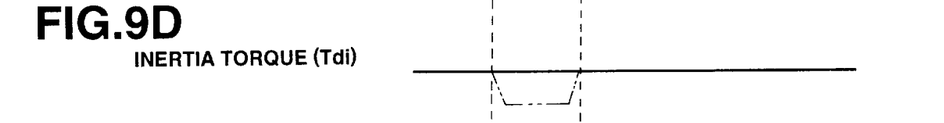

Herein, a discussion will be started as to the case that the downshift by the operation of the accelerating pedal 6 as shown in FIG. 9A is executed while executing the above-mentioned throttle opening control.

Figure 9E:
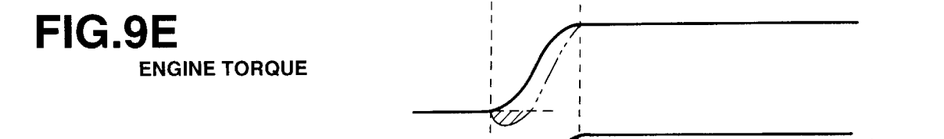
Figure 9F:
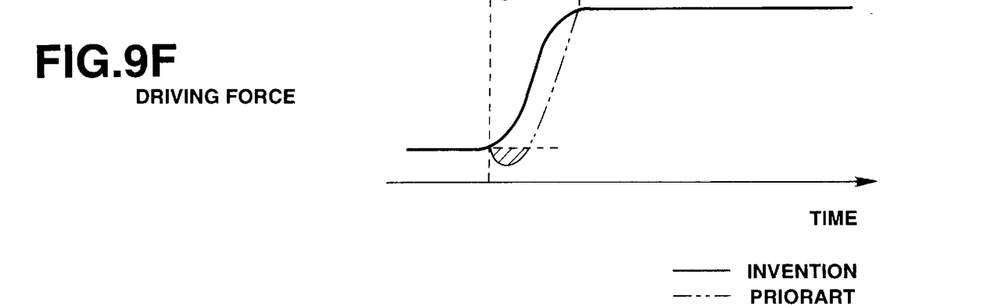

As shown in FIGS. 9E and 9F, by this control, the engine torque and the wheel driving force are increased from two-dots chain lines to continuous lines. This increased engine torque functions to cancel the inertia torque shown by a two-dot chain line of FIG. 9D so as to flatten the inertia torque as shown by a continuous line of FIG. 9D. This prevents the generation of areas indicated by hatching parts as to the engine torque and the driving force, and therefore the shift shock (having a torque drop feeling), which is caused by the inertia torque $T_{di}$, is reduced.

With this shift shock reducing function ensured by the first embodiment of the shift shock reducing apparatus according to the present invention, the shift shock reducing effect is ensured without generating the shift delay as is clear from the comparison between the continuous lines and the two-dot chain lines. This also prevents the delay of the change of the driving force caused by the shift delay.

Further, although the shift shock having a pop-up feeling is generated by the upshift, the throttle opening control executed by the shift shock reducing apparatus according to the present invention cancels the inertia torque $T_{di}$ caused by the upshift by decreasing the engine torque and the wheel driving force so as to decrease the shift shock during the upshift.

The shift shock reducing apparatus of the first embodiment is arranged to calculate the actual CVT ratio $i_p$ from the ratio between the primary rotation speed detection value $N_{pri}$ and the secondary rotation speed detection value $N_{sec}$ and to calculate the rate $(d/dt)i_p$ of change of the CVT ratio $i_p$ from the change amount of the actual CVT ratio $i_p$ by one control cycle period. This simplified construction for obtaining the rate $(d/dt)i_p$ decreases the cost for obtaining it.

Since the primary rotation speed detection value $N_{pri}$ and the secondary rotation speed detection value $N_{sec}$ include noise due to the rotational fluctuation of the pulleys 7 and 8, the calculation result of the shift speed $(d/dt)i_p$ tends to fluctuate and to be inaccurate.

In order to improve this tendency of the calculated shift speed $(d/dt)i_p$, at least one of the primary rotation speed detection value $N_{pri}$, the secondary rotation speed detection value $N_{sec}$, the actual CVT ratio $i_p$ and the shift speed $(d/dt)i_p$ is processed by a filtering process so as to eliminate the noises from the calculation result of the shift speed $(d/dt)i_p$. However, this filtering process generates the detection delay of the shift speed $(d/dt)i_p$, if it is simply executed.

Figure 5:
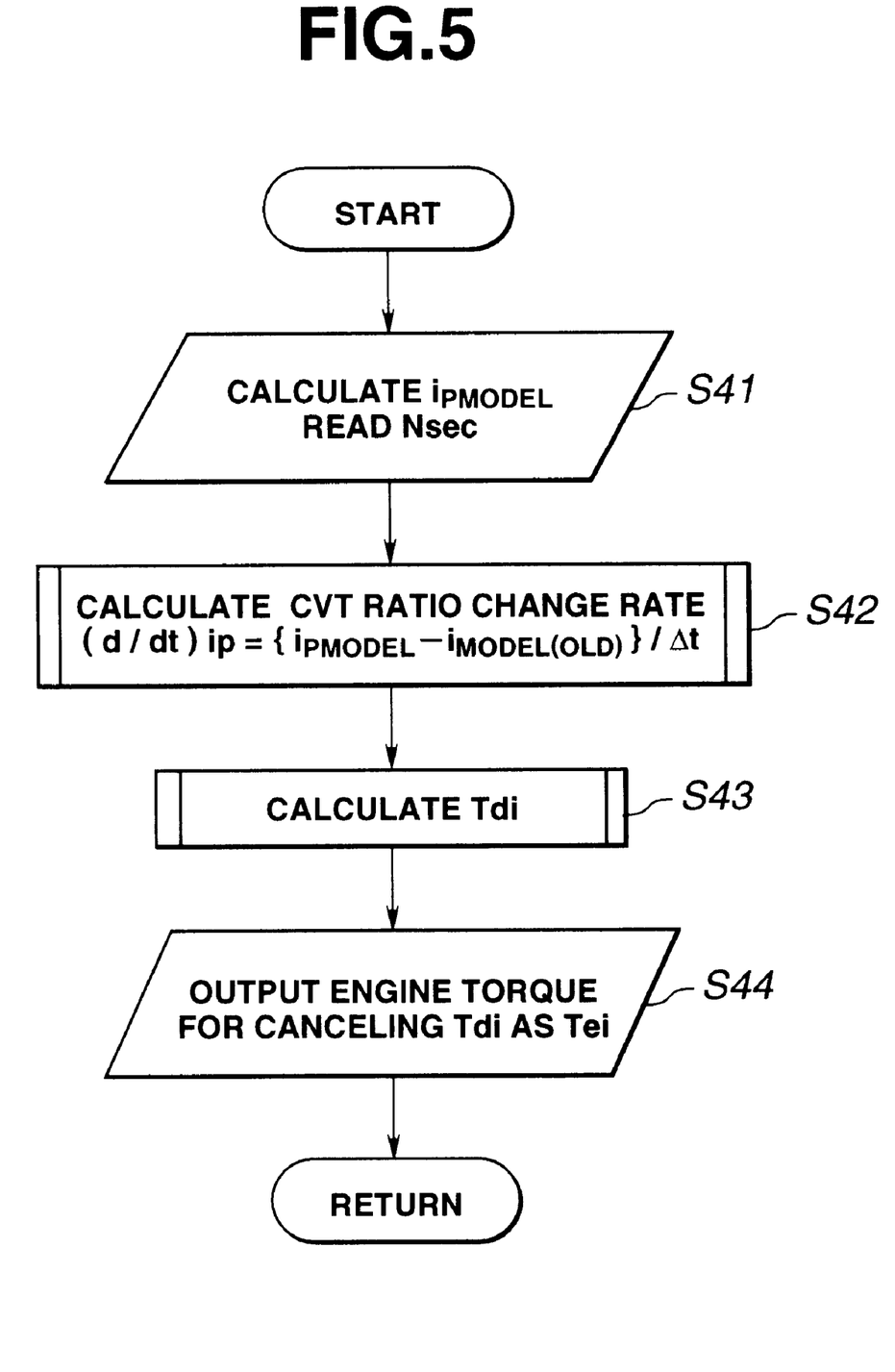
FIG. 5 is a flowchart showing a throttle control program for reducing the shift shock during a shifting executed by the controller of a second embodiment.

Referring to FIG. 5, there is shown a flowchart of the throttle opening control of a second embodiment which embodies the shift shock reducing apparatus of the CVT equipped vehicle in accordance with the present invention. The second embodiment is arranged to solve the detection delay caused by the filtering process. The basic construction of the second embodiment except for the throttle opening control is the same as that of the first embodiment shown in FIG. 1. In this second embodiment, the CVT 2 is expressed by a mathematical model, and the data of this mathematical model is stored in the controlled 13.

The throttle opening control shown in FIG. 5 will be discussed.

At a step S41, the controller 13 calculates the present actual CVT ratio $I_{PMODEL}$ by applying the shift control command to the mathematical model of the CVT 2. Further, the controller 13 reads the secondary rotation speed $N_{sec}$.

At a step S42, the controller 13 calculates the shift speed $(d/dt)i_p$ by subtracting the previous actual CVT ratio $i_{MODEL (OLD)}$ from the present actual CVT ratio $I_{PMODEL}$ and by dividing the obtained difference by the calculating cycle period $\Delta t$ of FIG. 5.

At a step S43, the controller 13 calculates the inertia torque caused by the shifting as is similar to the manner of the step S33 of the first embodiment.

At a step S44, the controller 13 calculates the correction torque $T_{ei}$ from the equation (5) or (13) as is similar to the manner of the step S34 of the first embodiment and outputs the engine torque conversion value $T_{ei}$ for canceling the inertia torque $T_{di}$ as the correction torque.

With the thus arranged second embodiment, the shift speed $(d/dt)i_p$ is obtained without employing the detection values of the primary rotation speed $N_{pri}$ and the secondary rotation speed $N_{sec}$. Therefore, the calculation value of the shift speed $(d/dt)i_p$ is free from noise, and this facilitates to execute a filtering process for eliminating noises. This enables the shift speed $(d/dt)i_p$ to be accurately obtained.

Figure 6:
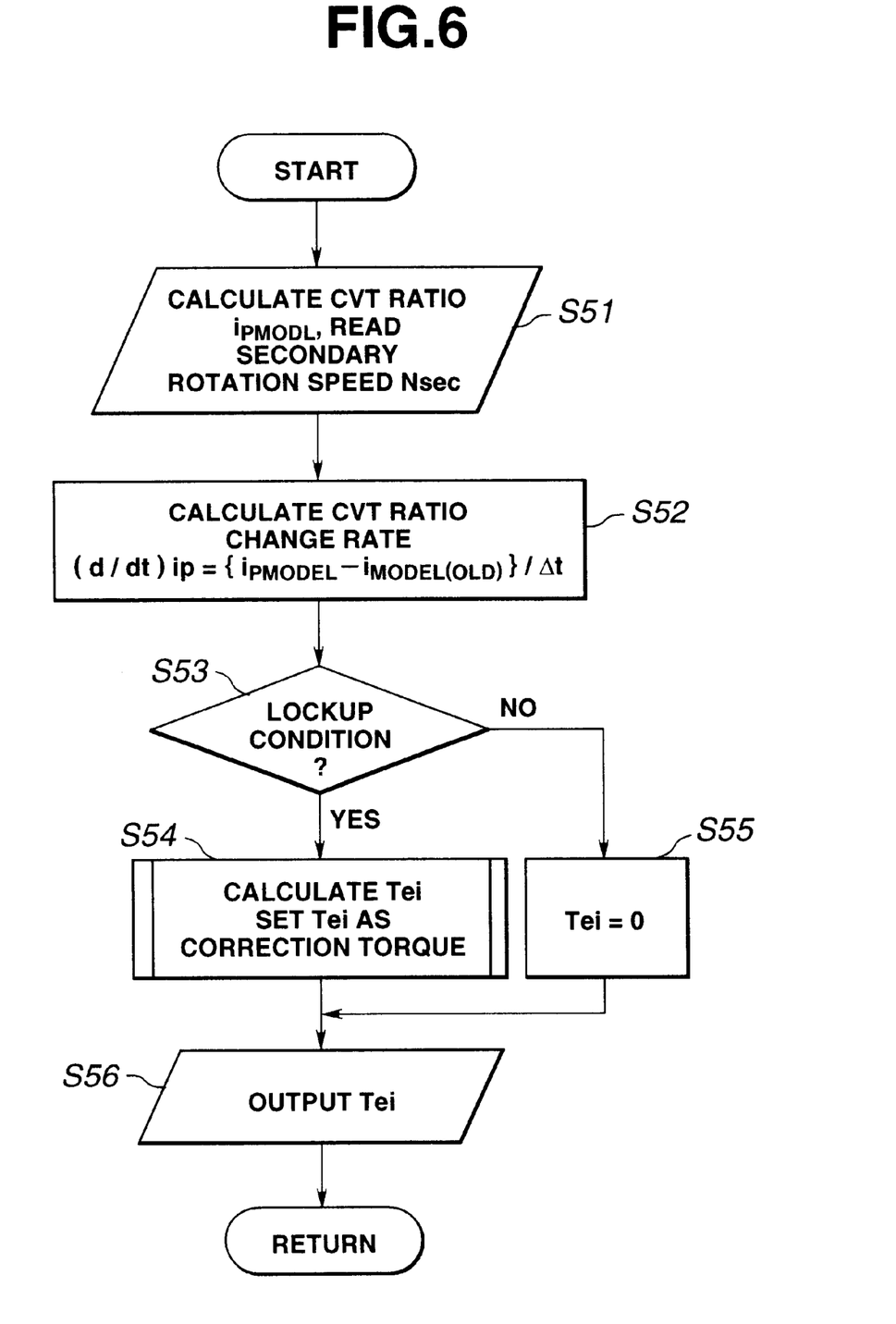
FIG. 6 is a flowchart showing a throttle control program for reducing the shift shock during a shifting executed by the controller of a third embodiment.

Referring to FIG. 6, there is shown a third embodiment of the shift shock reducing apparatus according to the present invention. The third embodiment is arranged to obtain the mathematical model of the CVT 2 as is the same as the manner of the second embodiment. The basic construction of the third embodiment except for the throttle opening control is the same as that of the first embodiment shown in FIG. 1. The third embodiment is further arranged not to execute the shift shock reducing process when the torque converter 6 is put in the converter condition. The reason for this is that the shift shock under the converter condition of the torque converter 6 is absorbed by the torque fluctuation absorbing function of the torque converter 6 under the converter condition so as to be negligible. The throttle opening control of the third embodiment will be discussed in detail with reference to the flowchart of FIG. 6.

At a step S51, the controller 13 calculates the present actual CVT ratio $i_{PMODEL}$ by applying the shift control command to the mathematical model of the CVT 2. Further, the controller 13 reads the secondary rotation speed $N_{sec}$.

At a step S52, the controller 13 calculates the rate (shift speed) $(d/dt)i_p$ of change in the CVT ratio $i_p$ by subtracting the previous actual CVT ratio $i_{MODEL(OLD)}$ from the present actual CVT ratio $i_{MODEL}$ and dividing the obtained difference by the calculation cycle period $\Delta t$ of the flowchart shown in FIG. 6.

At a step S53, the controller 13 determines as to whether the torque converter 6 is put in the lockup condition or not. When the determination at the step S53 is affirmative, the routine proceeds to a step S54. When the determination at the step S53 is negative, the routine proceeds to a step S55.

At the step S54, the controller 13 calculates the correction torque $T_{ei}$ from the rate $(d/dt)i_p$ obtained at the step S51, the secondary rotation speed $N_{sec}$ obtained at the step S52 and the equation (5).

At the step S55, the controller 13 sets the correction torque at zero ($T_{ei}=0$).

Following to the execution of the step S54 or S55, the routine proceeds to a step S56 wherein the controller 13 outputs the correction torque $T_{ei}$. That is, the controller 13 executes the throttle control of the throttle valve 5 by outputting the command signal indicative of the corrected target throttle opening TVO* to the stepping motor 4 so as to adjust the actual throttle opening TVO at the target throttle opening TVO*.

Since the inertia torque caused by the shifting is cancelled by the changes of the engine torque and the wheel driving force through the throttle opening control of the shift shock reducing apparatus, the shift shock due to the inertia torque is reduced.

The third embodiment is arranged so as not to execute the correction of the engine torque by setting the correction torque $T_{ei}$ at 0 when the torque converter 6 is put in the converter condition. The reason for this arrangement of the third embodiment is that in almost all situations of the converter condition the torque converter 6 functions to absorb the torque fluctuation by means of the relative rotation between the input and output elements thereof through fluid. This fluctuation absorbing function also functions to cancel the shift shock and enables the shift shock reducing control to be cancelled.

Figure 7:
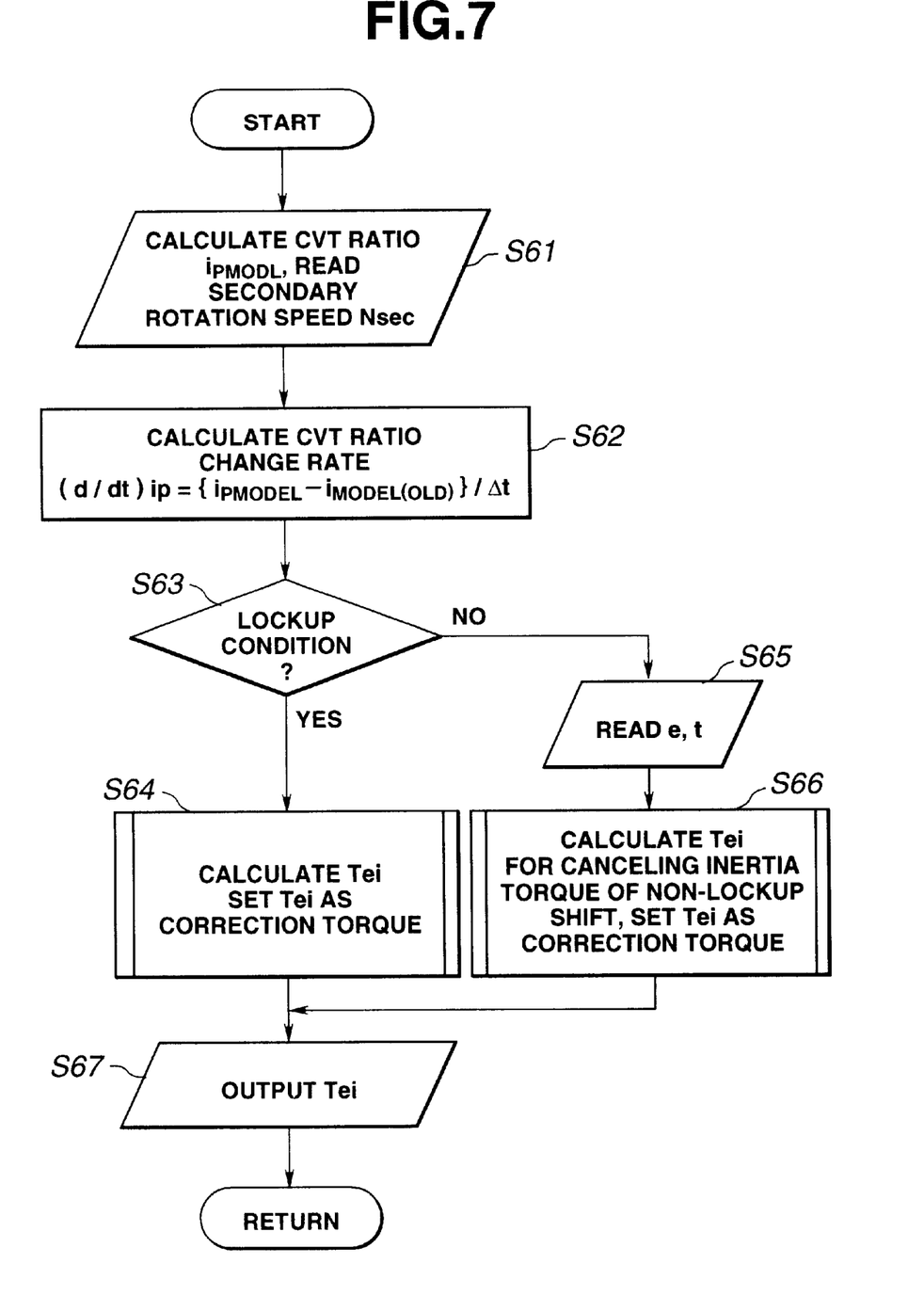
FIG. 7 is a flowchart showing a throttle control program for reducing the shift shock during a shifting executed by the controller of a fourth embodiment.

Further, if the shift shock reducing control (engine torque changing operation) is required even under the converter condition, the third embodiment may is arranged to execute the control shown by a flowchart of FIG. 7. Herein, this arrangement shown by the flowchart of FIG. 7 will be discussed as an operation of a fourth embodiment.

At a step S61, the controller 13 calculates the present actual CVT ratio $i_{PMODEL}$ by applying the shift control command to the mathematical model of the continuously variable transmission 2. Further, the controller reads the secondary rotation speed $N_{sec}$.

At a step S62, the controller 13 calculates the shift speed $(d/dt)i_p$ by subtracting the previous actual CVT ratio $i_{MODEL (OLD)}$ from the present actual CVT ratio $i_{PMODEL}$ and dividing the obtained difference by the calculating cycle period $\Delta t$ of the flowchart shown in FIG. 7.

At a step S63, the controller 13 determines as to whether the torque converter 6 is put in the lockup condition or not. When the determination at the step S63 is affirmative, the routine proceeds to a step S64. When the determination at the step S63 is negative, the routine proceeds to a step S65.

At the step S64, the controller 13 calculates the correction torque $T_{ei}$ (for canceling the inertia torque caused by the shifting under the lockup condition) from the shift speed $(d/dt)i_p$ obtained at the step S61, the secondary rotation speed $N_{sec}$ obtained at the step S62 and the equation (5).

At the step S65, the controller 13 reads the speed ratio e and the toque ratio t of the torque converter 6.

Following to the execution of the step S65, the routine proceeds to a step S66 wherein the controller 13 calculates the correction torque $T_{ei}$ for canceling the inertia torque caused by the shifting under the converter condition from the shift speed $(d/dt)i_p$ obtained at the step S61, the secondary rotation speed $N_{sec}$ obtained at the step S62 and the equation (13).

Following to the execution of the step S64 or S66, the routine proceeds to a step S67 wherein the controller 13 outputs the correction torque $T_{ei}$. That is, the controller 13 executes the throttle control of the throttle valve 5 by outputting the command signal indicative of the corrected target throttle opening TVO* to the stepping motor 4 so as to adjust the actual throttle opening TVO at the target throttle opening TVO*.

Since the inertia torque caused by the shifting is cancelled by the change of the engine torque and the wheel driving force through the throttle opening control of the shift shock reducing apparatus, the shift shock due to the inertia torque is reduced.

Since the fourth embodiment is arranged to execute the correction of the engine torque even under the converter condition by employing the amount determined at the step S66, it is possible to ensure the predetermined shift-shock reducing effect even under the converter condition according to the requirement.

Figure 8:
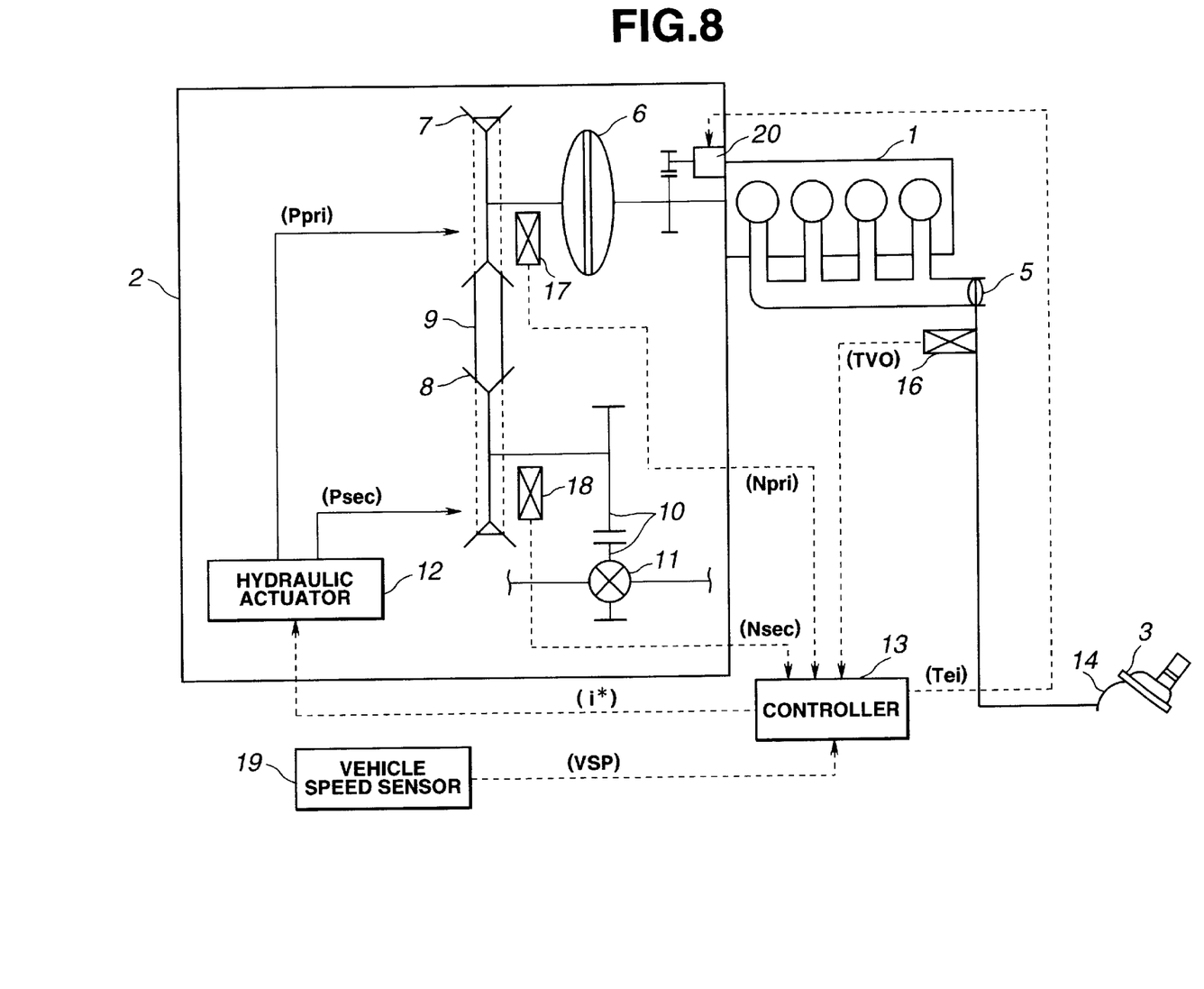
FIG. 8 is a schematic view showing a power train of an automotive vehicle equipped with a continuously variable transmission which is provided with a shift shock reducing apparatus of a fifth embodiment according to the present invention.

Referring to FIG. 8, there is shown a fifth embodiment of the shift shock reducing apparatus according to the present invention. As shown in FIG. 8, the construction of the fifth embodiment is generally the same as that of the first embodiment show in FIG. 1 except that a reversible motor 20 is installed to a transmission system of the CVT 2 such as at a portion between the engine 1 and the torque converter 6. Further, the controller 13 is arranged to drive the reversible motor 20 in order to generate the correction torque $T_{ei}$ instead of the engine torque control for canceling the inertia torque caused by the shifting. The reversible motor 20 generates a torque corresponding to the correction torque $T_{ei}$ and supplies it to the transmission system of the power train instead of the changing operation of the engine torque.

The shift control and the throttle opening control of the fifth embodiment are the same as those of the first embodiment except that in the fifth embodiment the reversible motor 20 applies the correction torque to the transmission system of the vehicle.

With the thus arranged fifth embodiment, it is possible to facilitate the engine torque control for canceling the inertia torque caused by the shifting. This will provide the good result to the driving performance of the vehicle. Further, since the fifth embodiment does not require to electronically control the throttle valve 5, it is possible to employ a mechanical throttle valve linked with the acceleration pedal 3.

Although the preferred embodiment according to the present invention has been shown and described to employ the stepping motor 4 as shown in FIG. 1, the present invention is not limited to this and may employ a DC motor instead of the stepping motor.

What is claimed is:

1. A shift shock reducing apparatus of a vehicle, the vehicle being equipped with a power train constituted by a continuously variable transmission (CVT) and an engine, the shift shock reducing apparatus comprising:
    a calculating section calculating an inertia torque caused by a shifting from a rate of change in a CVT ratio per time; and
    an output torque correcting section correcting an output torque of the engine on the basis of the calculated inertia torque so as to cancel the inertia torque.

2. A shift shock reducing apparatus of a vehicle, the vehicle being equipped with a power train constituted by a continuously variable transmission (CVT) and an engine, the shift-shock reducing apparatus comprising:
    a calculating section calculating an inertia torque caused by a shifting from a rate of change in a CVT ratio per time; and
    an inertia torque canceling motor applying a torque for canceling the inertia torque to a transmission system of the CVT on the basis of the calculated inertia torque.

3. A shift shock reducing apparatus as claimed in claim 1, wherein the rate of change in the CVT ratio per time is calculated from a change amount of the CVT ratio by each predetermined cycle period.

4. A shift shock reducing apparatus as claimed in claim 3, wherein the transmission ratio is calculated from a ratio between a transmission input rotation speed and a transmission output rotation speed.

5. A shift shock reducing apparatus as claimed in claim 3, wherein the rate of change in the transmission ratio per time is processed by a filter process for eliminating noises from the rate.

6. A shift shock reducing apparatus as claimed in claim 4, wherein the transmission ratio is processed by a filter process for eliminating noises from the rate of change in the transmission ratio.

7. A shift shock reducing apparatus as claimed in claim 1, wherein the inertia torque generated by the shifting is calculated from the rate of change in the transmission ratio and at least one of a speed ratio, a torque ratio and a torque capacity coefficient of a torque converter when the torque converter is installed between the engine and the CVT.

8. A shift shock reducing apparatus as claimed in claim 7, where a calculating method of the inertia torque generated by the shifting is changed according to the operating condition of the torque converter.

9. A shift shock reducing apparatus as claimed in claim 9, wherein the operating condition includes a lockup condition where input and output elements of the torque converter are directly connected and a converter condition where the direct connection between the input and output elements is released.

10. A shift shock reducing apparatus as claimed in claim 8, wherein a torque for canceling the inertia torque is generated when the torque converter is put in the lockup condition.

11. A shift shock reducing apparatus as claimed in claim 8, wherein a generation of a torque for canceling the inertia torque is prevented when the torque converter is put in the converter condition.

12. A shift shock reducing apparatus of a vehicle, the vehicle being equipped with a power train of a belt type continuously variable transmission (CVT) and an internal combustion engine, the shift shock reducing apparatus comprising:
    a primary rotation speed sensor detecting a rotation speed of a primary pulley of the CVT;
    a secondary rotation speed sensor detecting a rotation speed of a secondary pulley of the CVT;
    a throttle valve controlling the flow of air supplied to cylinders of the engine; and
    a controller arranged to calculate an inertia torque caused by a shifting from a rate of change in a ratio of the primary rotation speed to the secondary rotation speed and to control an opening of said throttle valve so as to cancel the inertia torque.

13. A shift shock reducing apparatus of a vehicle, the vehicle being equipped with a power train of a belt type continuously variable transmission (CVT) and an internal combustion engine, the shift shock reducing apparatus comprising:
- a reversible motor installed between the CVT and the engine;
- a primary rotation speed sensor detecting a rotation speed of a primary pulley of the CVT;
- a secondary rotation speed sensor detecting a rotation speed of a secondary pulley of the CVT; and
- a controller arranged to calculate an inertia torque caused by a shifting from a rate of change in a ratio of the primary rotation speed to the secondary rotation speed and to control said reversible motor so as to generate a torque for canceling the inertia torque.

14. A shift shock reducing apparatus of a vehicle, the vehicle being equipped with a power train constituted by a continuously variable transmission (CVT) and an engine, the shift shock reducing apparatus comprising:
- a calculating means for calculating an inertia torque caused by a shifting from a rate of change in a CVT ratio per time; and
- an output torque correcting means for correcting a toque inputted to the CVT on the basis of the calculated inertia torque so as to cancel the inertia torque.

15. A shift shock reducing apparatus as claimed in claim 14, wherein said output torque correcting means correcting the CVT output torque by correcting an output torque of the engine through a control of a throttle valve.

16. A shift shock reducing apparatus as claimed in claim 14, wherein said output torque correcting means includes a reversible motor which generates a torque for canceling the inertia torque and applies the generated torque to the CVT.

* * * * *